United States Patent [19]

Stelovsky

[11] Patent Number: 5,613,909
[45] Date of Patent: Mar. 25, 1997

[54] TIME-SEGMENTED MULTIMEDIA GAME PLAYING AND AUTHORING SYSTEM

[76] Inventor: Jan Stelovsky, 2049 Oswald St., Honolulu, Hi. 96816

[21] Appl. No.: 278,946

[22] Filed: Jul. 21, 1994

[51] Int. Cl.⁶ ....................................... A63F 9/22
[52] U.S. Cl. .................... 463/1; 463/30; 463/40; 434/307 A; 434/309; 434/323; 434/327
[58] Field of Search ..................... 273/433, 434, 273/435, 436, 437, 439, 85 G, DIG. 28, 460, 430, 432; 434/307 A, 307, 308, 309, 315, 316, 323, 327; 364/412

[56] References Cited

U.S. PATENT DOCUMENTS

| | | | |
|---|---|---|---|
| 4,305,131 | 12/1981 | Best | 364/410 |
| 4,360,345 | 11/1982 | Hon | 434/323 |
| 4,634,386 | 1/1987 | Tamaki | 434/323 |
| 4,712,180 | 12/1987 | Fujiyama et al. | 434/309 |
| 4,798,543 | 1/1989 | Spiece | 434/323 |
| 5,065,345 | 11/1991 | Knowles et al. | 434/323 |
| 5,106,097 | 4/1992 | Levine | 273/460 |
| 5,250,747 | 10/1993 | Tsumura | 434/307 A |
| 5,267,865 | 12/1993 | Lee et al. | 434/323 |
| 5,377,997 | 1/1995 | Wilden et al. | 273/434 |
| 5,393,073 | 2/1995 | Best | 273/434 |
| 5,395,123 | 3/1995 | Kondo | 434/307 A |
| 5,397,853 | 3/1995 | Koguchi | 434/307 A |
| 5,447,438 | 9/1995 | Wantanabe et al. | 434/307 A |

*Primary Examiner*—Jessica Harrison
*Assistant Examiner*—Mark A. Sager
*Attorney, Agent, or Firm*—Leighton K. Chong

[57] ABSTRACT

An interactive system is provided for playing a game, educational or instructional sequence in conjunction with a prerecorded multimedia presentation consisting of at least motion video, sound and accompanying text. The multimedia presentation is partitioned into time segments. The game sequence is also partitioned into task units that are synchronized with the time segments. The time address markers for the beginning and ending of each of the time segments initialize, execute and close each task unit of a programmed game sequence. A corresponding authoring system allows an author to design and implement the time-segmentation of the multimedia presentation and its functional interface with the game sequence. This system can be used for motivating instructional games based on music video, movies, animated cartoons and karaoke that provide the player with the same excitement and challenge of the popular video games. The games can contain educational contents and be used for teaching and training reading comprehension and foreign language instruction. Similarly, motivating tests based on this concept can accompany training in other subjects. The provided multimedia games can be the basis of many products in the emerging "edutainment" industry that combines education and entertainment.

16 Claims, 18 Drawing Sheets

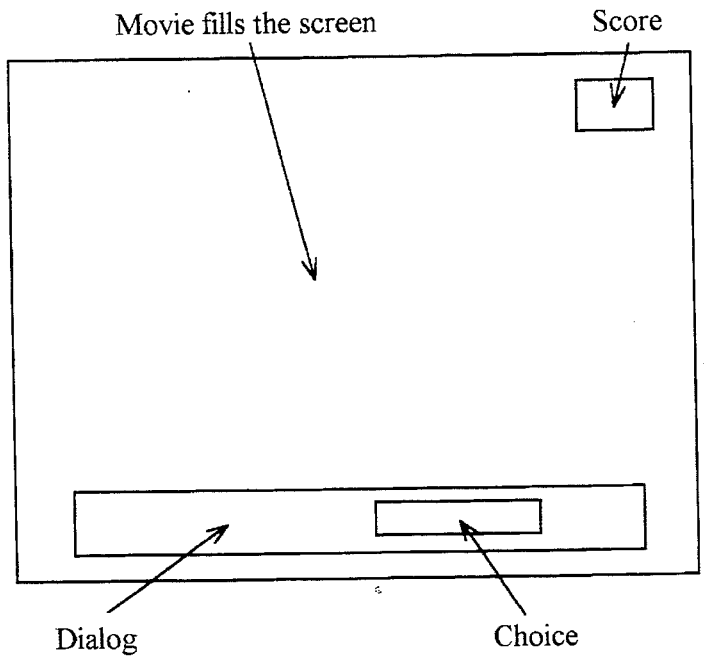

FIG. 10

| management of segments | editing of boundaries |
|---|---|
| add | select start or end point |
| delete | increase time |
| select | decrease time |
| link resources | set duration |
| link text | set duration type |
| management of choices | set delta to adjacent point |
| add | set delta type |
| delete | replay |
| select | editing of text |
| link value | add |
| link feedback | delete |
| link text | select |
| specification of presentation | |
| select | |

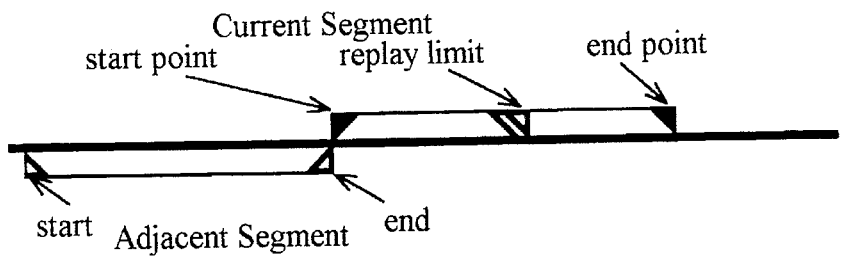
FIG. 13a
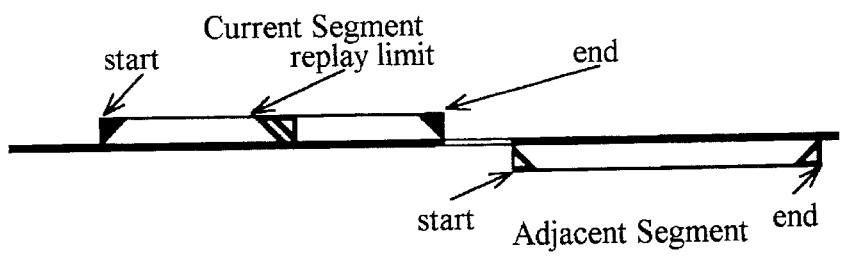
FIG. 13b
| ⦿ start | end ○ | adjacent point | replay | scroll |
|---|---|---|---|---|
| ++ | + | ⦿ const  0 | ○ segment | ⇐ 10000 ⇒ |
| 11520 | 14839 | ○ at least | ⦿ delta (s) 1.6 | zoom |
| -- | - | ○ at most | ○ from/to | ⇩ 1/25 ⇧ |
FIG. 14

| Author |
|---|
| Undo |
| Update Segment<br>New Segment<br>Delete Segment<br>Init Segments |
| Update Event<br>New Event<br>Delete Event<br>Init Events |
| Associate<br>Check |

FIG. 15 form which uses video images, sound, and sometimes text to challenge a player to successfully execute a winning sequence of actions within a given time. Most video games impose time limits on the user's input. Often, the sequencing of video scenes is determined by the player's input. Some computerized games have been tied to real time constraints, such as for playing simultaneously with real-time events.
TIME-SEGMENTED MULTIMEDIA GAME PLAYING AND AUTHORING SYSTEM

1. BACKGROUND OF THE INVENTION

Movies, music videos and karaoke systems are some of the most successful forms of modern entertainment. Movies and music videos are essentially pre-recorded multimedia presentations with several synchronized tracks. A track is a recorded sequence of specific media type, such as motion video, audio, and text. (Examples of text tracks include movie subtitles and closed captioning.)

Karaoke systems are also multimedia presentations with prerecorded video and music audio tracks synchronized with a text display of lyrics, allowing the user to create a new vocal track in real time by singing into the microphone.

Video and electronic games are another popular entertainment form which uses video images, sound, and sometimes text to challenge a player to successfully execute a winning sequence of actions within a given time. Most video games impose time limits on the user's input. Often, the sequencing of video scenes is determined by the player's input. Some computerized games have been tied to real time constraints, such as for playing simultaneously with real-time events.

Other types of computerized games used for educational purposes include narrative or task sequences based on multiple choice, composition, fill-in-the-blanks or other related tasks. There are also instructional games based on motion video presentation which are accompanied by a text track, such as family of products from HyperGlot™ or subtitled films used for language instruction.

The object of the present invention is to combine the high entertainment value of movies, music videos, and other forms of multimedia presentations with the functional value of video and computerized games for educational and instructional tools.

2. SUMMARY OF THE INVENTION

The present invention provides an interactive system for playing a game, educational or instructional sequence in conjunction with a prerecorded multimedia presentation consisting of at least motion video, sound and accompanying text. The multimedia presentation is partitioned into time segments. The game sequence is also partitioned into task units that are synchronized with the time segments. The time address markers for the beginning and ending of each of the time segments initialize, execute and close each task unit of a programmed game sequence.

This system can be used for motivating instructional games based on music video, movies, animated cartoons and karaoke that provide the player with the same excitement and challenge of the popular video games. These games can contain educational contents and be used for teaching and training reading comprehension and foreign language instruction. Similarly, motivating tests based on this concept can accompany training in other subjects. The invention can be the basis of many products in the emerging "edutainment" industry that combines education and entertainment.

The invention also includes a corresponding authoring system which allows an author to design and implement the time-segmentation of the multimedia presentation and its functional interface with the game sequence.

2.1. DESCRIPTION OF THE DRAWINGS

The invention is described below in conjunction with the appended drawings, as follows:

FIG. 10 shows the screen layout of the Remote Movie Gain.

FIG. 11 shows the modules of Segmentation Authoring System.

FIG. 12 shows the screen snapshot from the Segmentation Authoring System.

FIG. 13a shows the graphical pane and its icons.

FIG. 13b shows the graphical pane when editing the end point.

FIG. 14 shows the lower panes of the segment specification area.

FIG. 15 shows the menu commands of Segmentation Authoring System.

3. DETAILED DESCRIPTION OF INVENTION 3.1. Overall System Architecture

Figure 1:
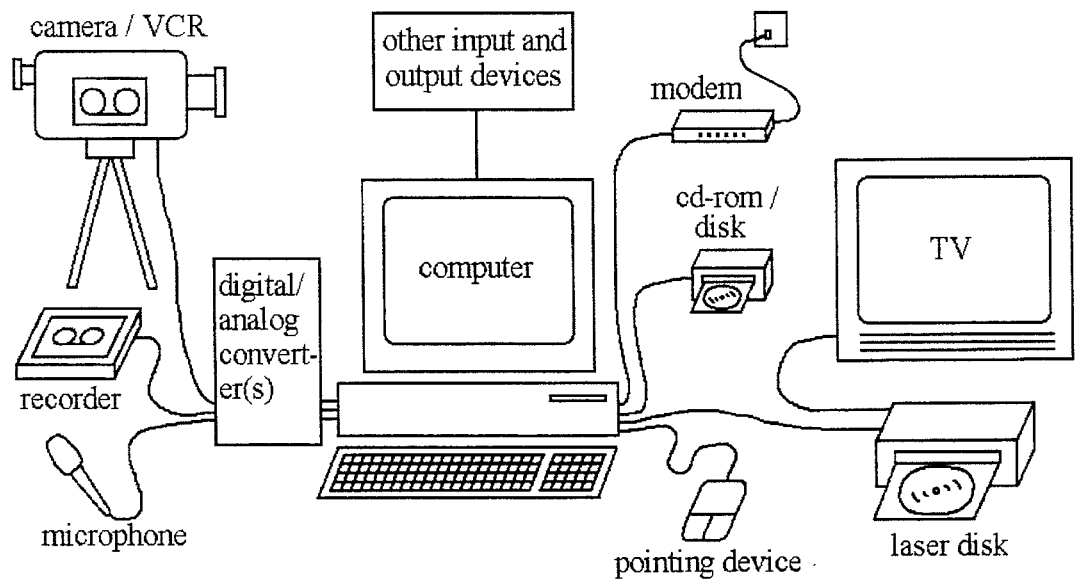
FIG. 1 shows the overall system architecture.

Referring to FIG. 1, the overall system architecture preferably includes:

computer terminal or game player component mass storage:
  hard disk
  CD-ROM or tape multimedia input sources, including:
  VCR+video frame digitizer
  CD-ROM
  audio player/recorder
  laser disk player
  keyboard or other means of text entry
  microphone sound or music input device with audio digitizer
input/game controls:
  keyboard
  mouse, joystick or other pointing device
  voice command microphone, speech digitizer
output/display devices:
  monitor
  audio speakers
  printer
  recorder, VCR, audio This system architecture can be used for production as well as for replay. The computer can also be in the form of a game player (e.g. Sega™) connected to a TV monitor. The computer preferably incorporates hardware that can either digitize audio and video (e.g. audio and frame digitizer boards) or play it directly through the speakers and in a window on the screen or a separate video monitor. If the multimedia game is used without recording, the camera/video/audio recording equipment and microphone components are not needed. Depending on the storage medium used for distributing the game, a CD-ROM drive, hard disk, laser disk player or another device is used. If broadcast services or network distribution is used, then a modem, Ethernet, or connection to an electronic gateway is provided.

3.1 Time Segmenting of Multimedia Presentation

In the basic process of this invention, a multimedia presentation is an arbitrary network of prerecorded media sequences where at least one sequence is dependent on time (i.e. the sequence is clocked while the presentation is playing.) The time-dependent sequence is composed of tracks that are synchronized with respect to a common time axis (hereinafter "multimedia presentation"). The basic track consists of video display images and is synchronized with at least one other track that consists of audio or text display. The types of video tracks include, but are not limited to, motion video, animation, or a sequence of still images, such as a slide show. The types of audio tracks include, but are not limited to, speech (such as dialog), song, or music. The types of textual track include, but are not limited to, the transcript of a sound track, such as transcript of movie dialog, song lyrics, a text narrative, or other textual works.

The synchronization among the individual tracks can be either continuous or discrete. In continuous synchronization, a track starts at a given point of time and continues until a given point of time is reached (e.g. motion video and audio). In discrete synchronization, a media asset is displayed at a given point of time (e.g. still image appears, text section is displayed or highlighted) and its display is altered at another given point of time (e.g. still image disappears, text section is erased or de-highlighted).

The multimedia presentation is segmented with respect to specific beginning and ending points of segments on the time axis, i.e. there are one or more points of time that partition the time axis into time segments. Typically, the multimedia presentation can be played either as a whole or in a segment-dependent fashion, for instance, when a pause or another media is played in between two time segments, or when the user is allowed to select and play an arbitrary time segment.

Other tracks of any other media format, such as motion video, audio, sequence of still images, or text can be associated with a multimedia presentation and be synchronized with respect to the presentation's time or its segments or be independent of its time axis. Such tracks can be provided or input by the user. An example of user's own input is recorded speech, video, or sound.

3.2. Multimedia Game Playing System

For purposes of this invention, a game, teaching, or instructional tool (hereinafter "multimedia game") is a software program that accepts a user's input during the time a time-segmented multimedia presentation is played, interprets the input as a selection among possible choices, evaluates the choice and provides the user with feedback about the value of the choice s/he has selected.

Figure 2:
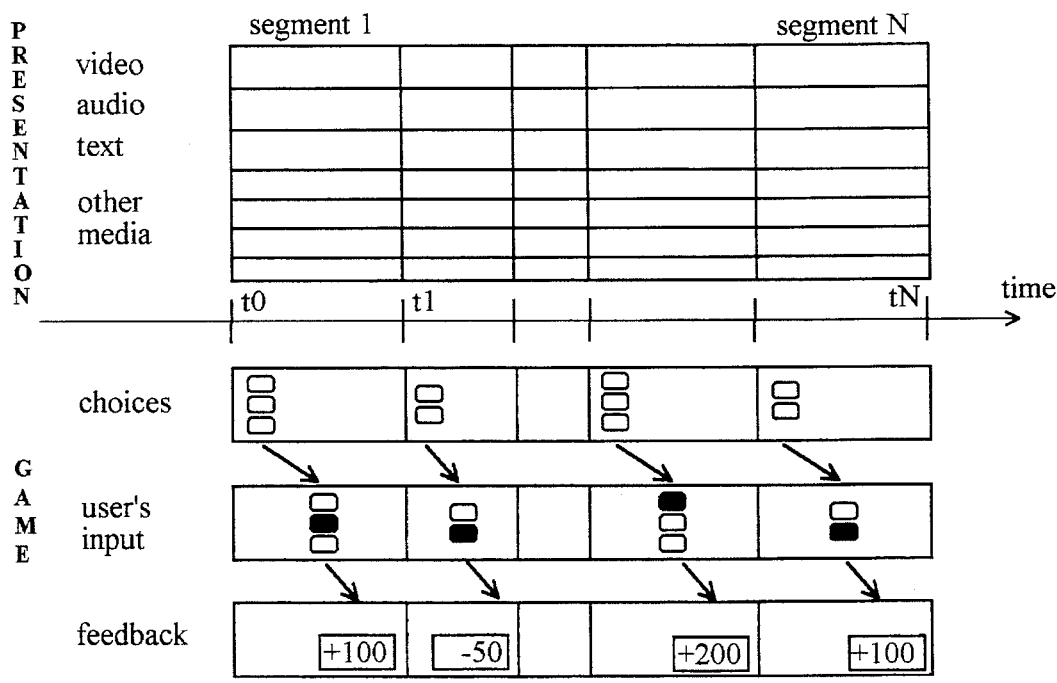
FIG. 2 shows the linking of multimedia presentation to the multimedia game.

Referring to FIG. 2, the basic functional linking of a time-segmented multimedia presentation and a game is accomplished in the following way. The multimedia game has two layers, 1) the multimedia presentation, and 2) the game program. The presentation has tracks that are synchronized and partitioned into N time segments. Without loss of generality, one can assume that the time segments are contiguous, i.e. each time segment I starts at time $T(I-1)$ and ends at $T(I)$, and the presentation starts at time $T(0)$ and ends at $T(n)$. (If there is a gap in between two time segments or two segments overlap, one can introduce an additional time segment that represents the gap or the overlap.)

By linking to the starting and ending times of each time segment of the presentation played, the game layer presents to the user the choices associated with each time segment. It then interprets the user's input as a selection of a choice, evaluates the selected choice and gives the user a feedback that reflects the resulting value.

Figure 3A:
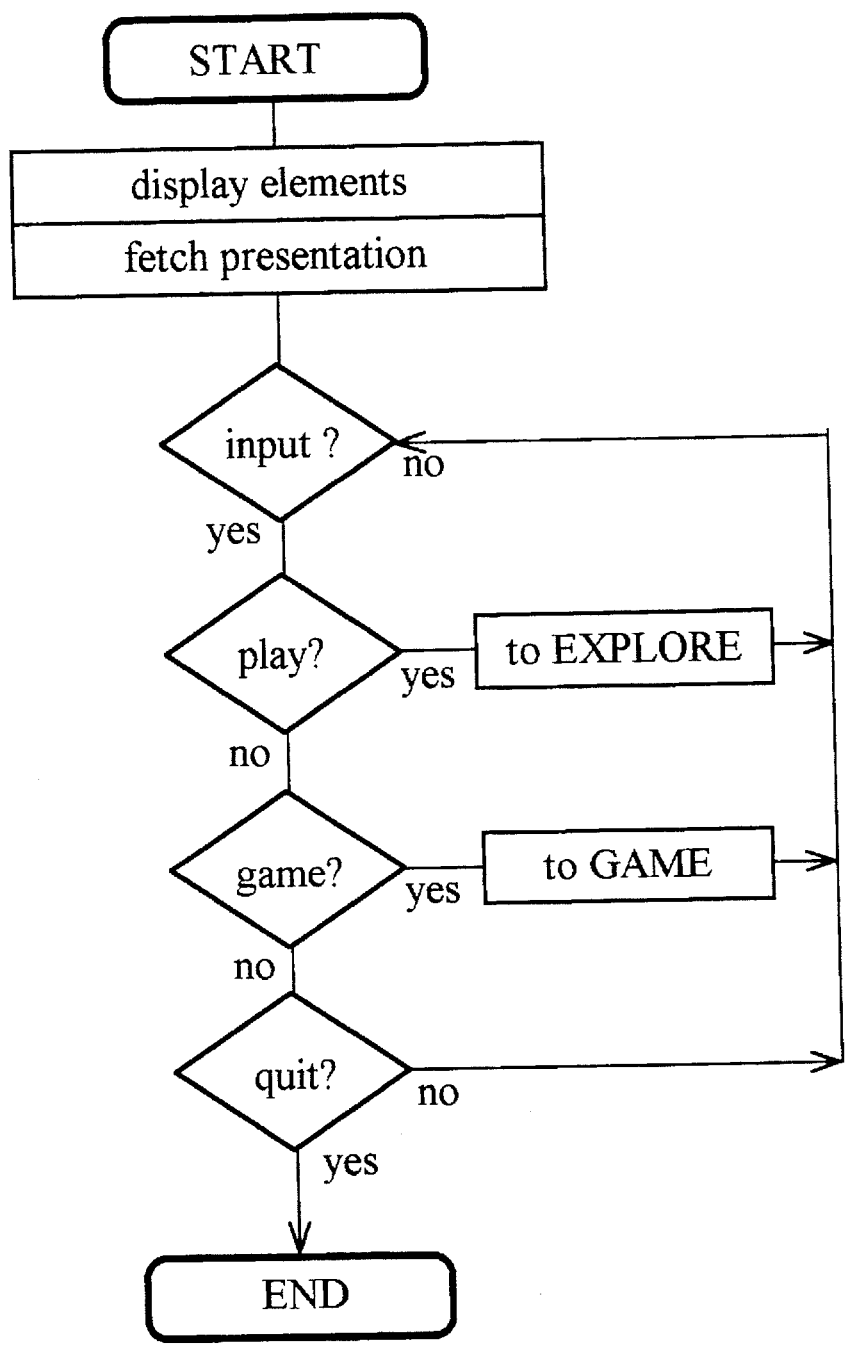
FIG. 3a shows the overall control flow diagram of basic Multimedia Game.

Referring to FIG. 3a, control of the multimedia game proceeds in the following steps. First, initial screen elements are displayed and the multimedia game is retrieved and initialized. Then the user can choose to enter the "explore" mode or the "game" mode (see below). Note that while the "explore" mode can give the user a preview of the presentation, it does not need to be included in the multimedia game. Finally, when the user decides to quit, the multimedia game is terminated.

Figure 3B:
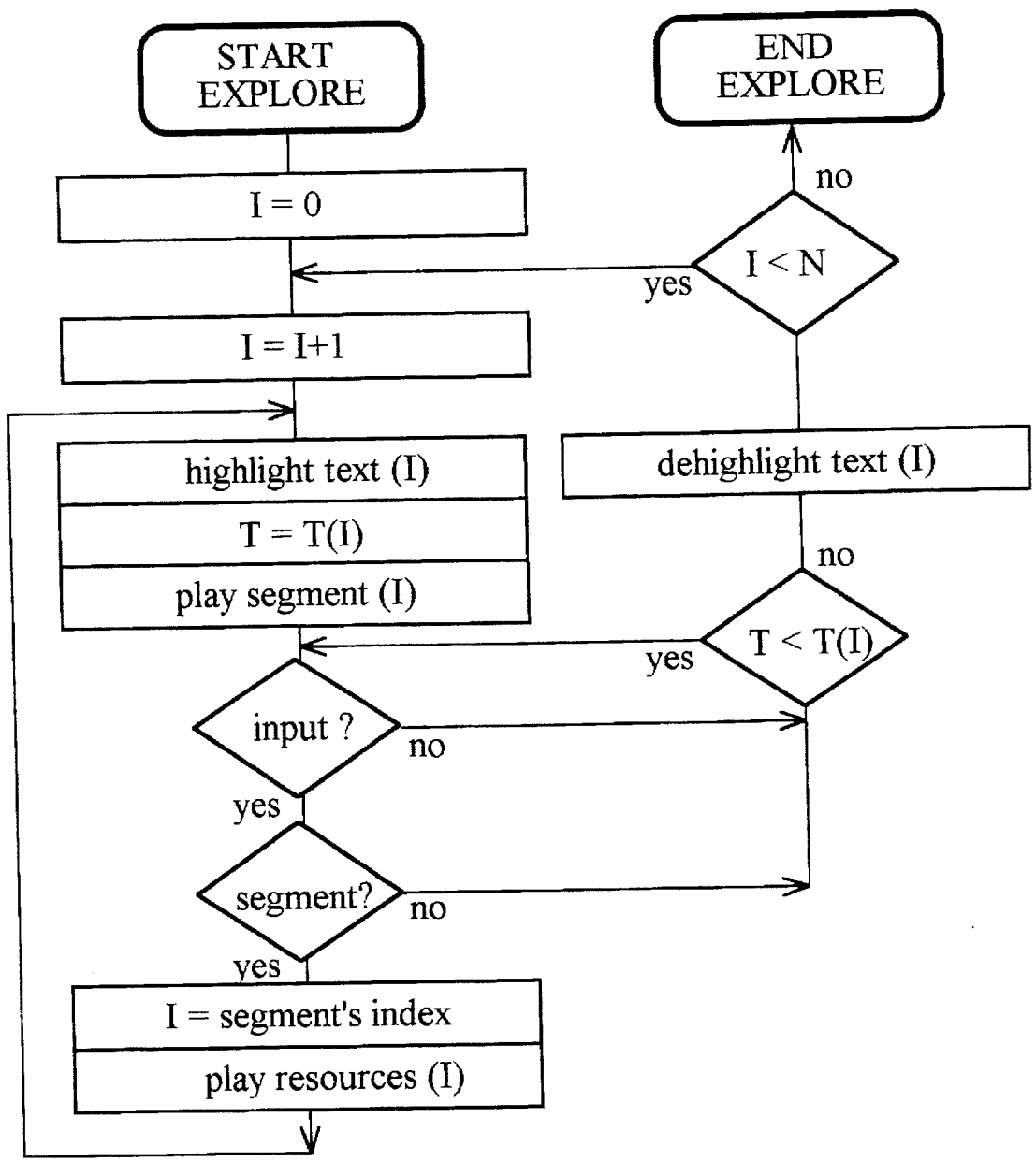
FIG. 3b shows the control flow diagram of explore mode in basic Multimedia Game.

Referring to FIG. 3b, the explore mode of the multimedia game proceeds in the following way. First, the section of the text linked to the time segment is highlighted, and the time segment of the presentation is retrieved and played. If there is no user input, the presentation continues playing until its end is reached. Then the text is de-highlighted and the presentation proceeds with the next time segment. If the user does not interact with the game, all of the time segments of the presentation will be played in sequence. The user can, however, interrupt the play and choose an arbitrary time segment. This can be realized, for instance, by clicking on any desired text section. Then an associated media asset (e.g. native speaker's pronunciation of the segment's text) can be played and the presentation resumes starting with the selected segment. Other forms of interaction with the user are possible, such as playing only one segment at a time or playing the time segments in randomly shuffled order.

Figure 3C:
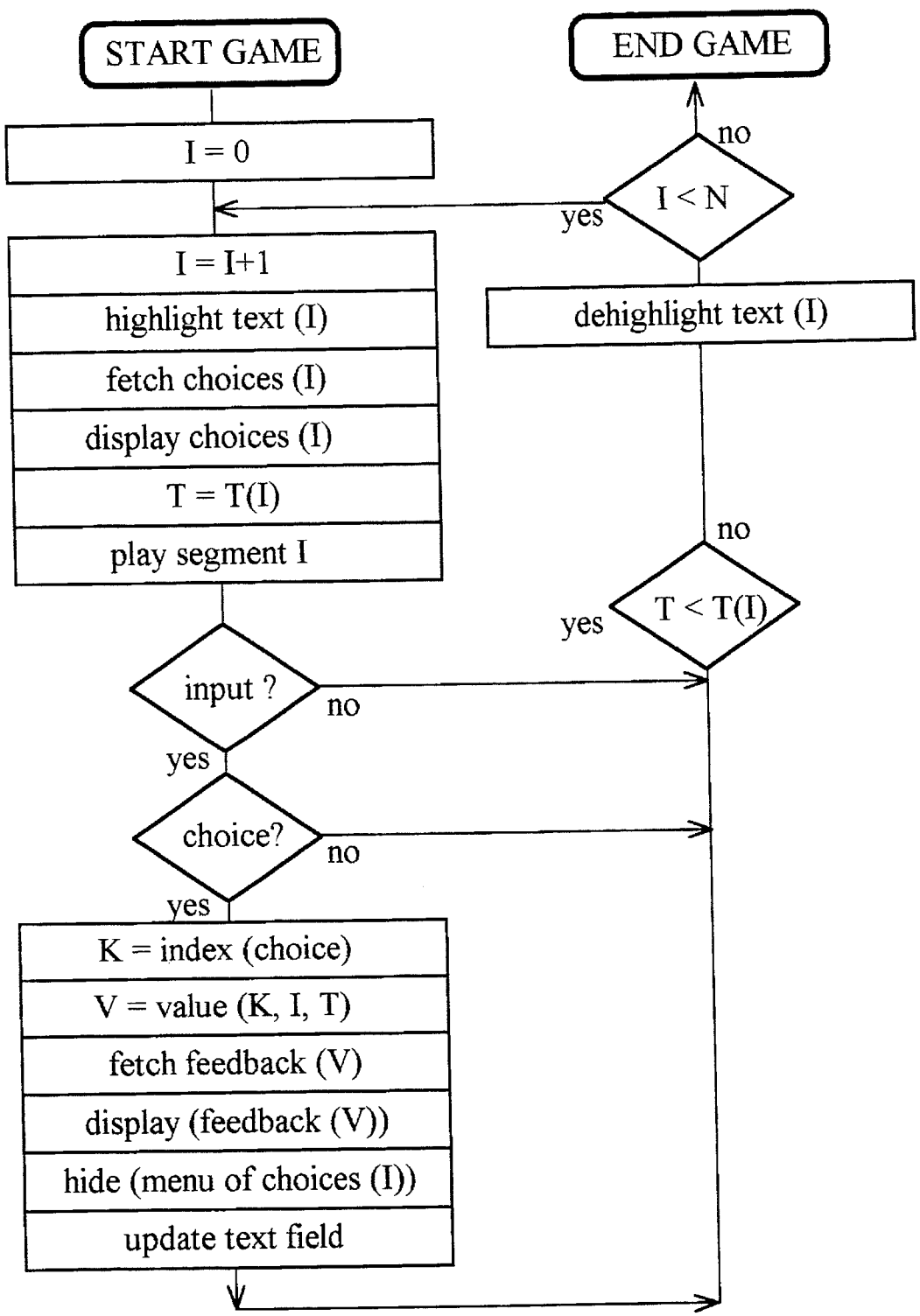
FIG. 3c shows the control flow diagram of game mode in basic Multimedia Game.

The control flow diagram in FIG. 3c illustrates the core multimedia game-playing algorithm for an example of a game in which a user selects a choice related to the text accompanying a multimedia presentation. It depicts the case that time segments are played in sequence without interruption. At the beginning of each time segment, the linked section of the text track is highlighted, and the choices available to the user for this segment are fetched. Then these choices can be presented to the user and the time segment of the presentation starts playing. While the time segment of the presentation is played, the multimedia game accepts user input and interprets it as a selection of a choice. The game program then fetches the value of the selected choice with respect to the current time segment and gives the user a sensory feedback of this value. Once the time segment reaches its ending point, the text is de-highlighted and the game proceeds with the next time segment.

If choices are presented to the user, they either can be displayed on the monitor or played as sound. For instance, the choices can be displayed as a menu in the "game" area of the screen. While at present only visual and audio output are available, any future sensory output is feasible. The choices can be presented either in sequence or several at a time. They can dynamically change according to time or the user's input. The set of choices can vary depending on the segment currently played and can include "distractor" choices that do not fit into the current context.

The user can input in numerous ways, e.g. click with a mouse on a choice within the menu, type a key that identifies a choice, select a choice with a joystick or pointer, push a software or hardware button while a choice is presented, identify a choice using a microphone or any other input device. The input can also be continuous, as in the recording of the user's voice.

The evaluation of user's choices usually depends on the duration of the current segment. (i.e. the value assigned to at least one user's choice changes either at the start time or at the end time of at least one segment.) Each choice is evaluated with respect to the current time and segment index.

The evaluation can result in one or more numbers, or an identification of a media element (e.g. image or sound), or simply in either a "correct" or an "incorrect" feedback, or any combination there of. The value of the user's choice can also depend on other factors, such as the history of the user's performance. For instance, if several choices are related to the same segment, selecting a choice might influence the evaluation of subsequent choices, e.g. the user might be required to select the choices in a certain order to receive the maximum score or an incorrect choice might decrease the value of the next correct choice.

The feedback to the user can be visual, such as incrementing a score or uncovering part of an image. It can be audio, such as a fanfare music, or any other sensory input. Note that a value that might be identified by omission of feedback, for instance the game program might offer feedback for all values except for the "incorrect" value. The user then can interpret the lack of feedback as an evaluation of his or her choice. The feedback can be tied to the multimedia presentation and influence its timing and sequencing. For instance, the current track can be repeated, the text track can be modified to reflect the user's choice or another media track can be played before the next segment starts playing.

There are several other variations on the schema depicted in FIG. 3c. For instance, the sequence of time segments can be shuffled instead of being played in its natural order. The choices can be displayed one at a time instead of in a menu. Also, all choices can be displayed in the beginning of the game. Choice of several variants can be offered to the user to reflect the difficulty of the game. Moreover one or more tracks of the presentation can be altered within the game mode.

3.3. Authoring System for Linking the Multimedia Game to Its Presentation

The construction of a time-segmented multimedia presentation and its linking with the multimedia game can be greatly simplified using a dedicated authoring system (Segmentation Authoring System or "SAS" hereinafter) that facilitates the identification of the points in time where a segment starts and the point where it ends. Such a system can also simplify the specification of additional resources linked to each time segment, the specification of user's choices linked to each segment, and the value and feedback linked to each choice.

Conventional video editing tools such as Premiere™ produced by Adobe Systems, Inc. of Mountain View, Calif., and products of Avid Technology, Inc., of Tewksbury, Mass., allow the author to synchronize moving images and sound tracks. Several of these tools allow the author to specify and export "Edit Decision Lists" (EDL) that define start and end points ("in" and "out" points) of a scene in time units (such as SMPTE™ time code). These tools aim at composing video and audio segments into one linear sequence rather than splitting one linear sequence into consecutive time segments. Therefore, they do not facilitate the editing of a boundary point in relation to its neighbor time segment. While these tools allow the author to replay only one time segment and some limit the replay to the "working space", they do not relate the replay time to the boundary point being edited. These tools also lack provisions for synchronization of EDLs with other resources, such as intervals of a separate text or other media types or events. Multimedia authoring tools such as Authorware™ or Director™, produced by MacroMedia of San Francisco, Calif., allow the author to place events on a time axis (called "score"), but they have no facilities to associate events directly with time segments.

Therefore, a modified user interface is used here for the task of defining the start and end points of segments. For instance, the task of splitting human speech into segments is particularly sensitive to the exact determination of those two boundary points.

Figure 4:
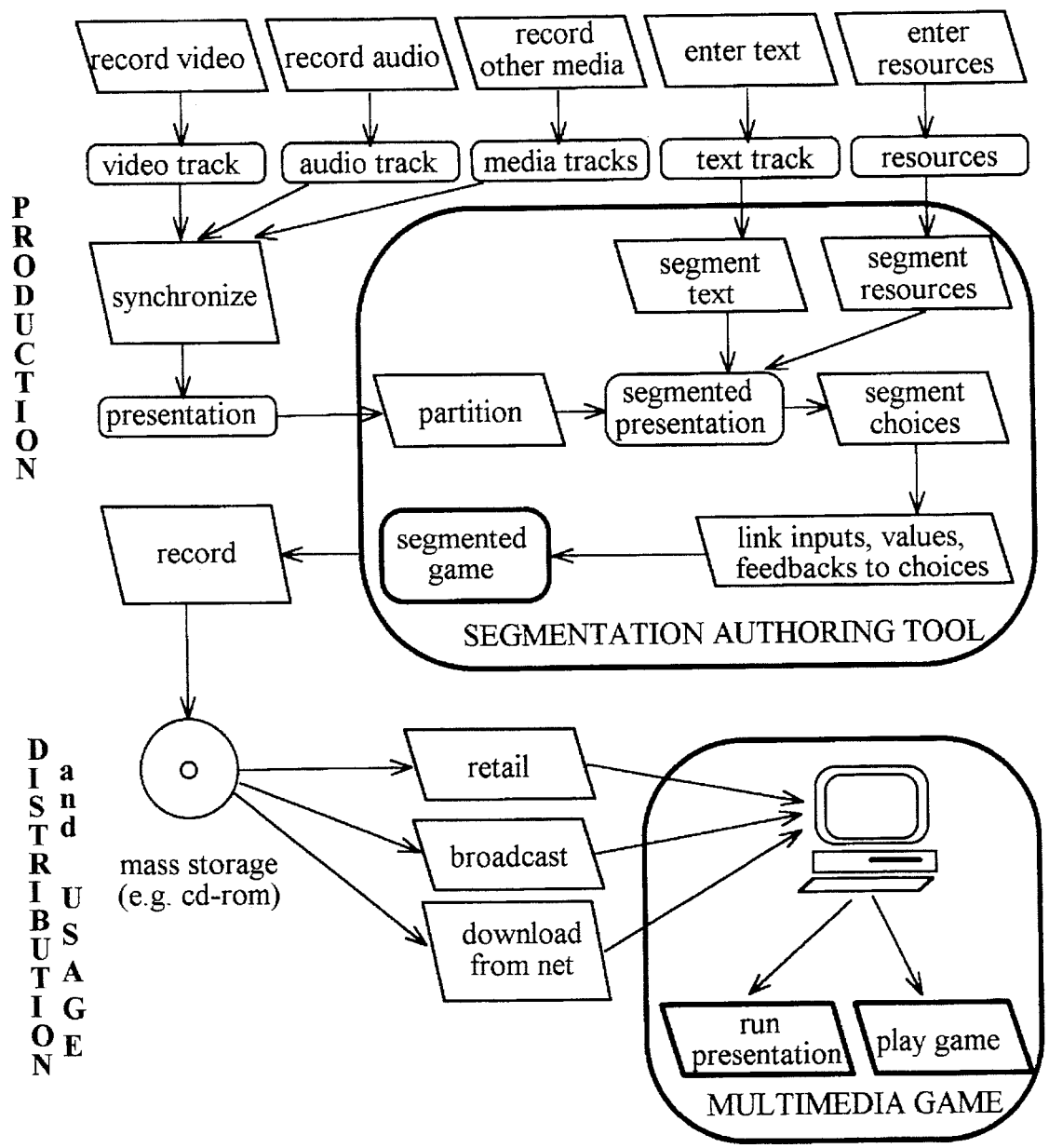
FIG. 4 shows the basic production process of the Multimedia Game.

Referring to FIG. 4, the authoring production of a multimedia game proceeds in the following steps.

1) The author produces a synchronized multimedia presentation. The recording and synchronization can be accomplished with well known hardware and software systems:
   audio and video can be recorded with microphone, tape recorder and camcorder, such as these produced by Sony™ Corp. of Tokyo, Japan
   audio and video can be digitized using a video grabber board (e.g. Media 100™ from Data Translations, Inc. of Marlboro, Mass.) or recorded in analog form on a laser disk (as provided by laser disk service bureaus)
   if necessary, audio and video tracks can be synchronized using well known linear editing systems such as Premiere™ produced by Adobe Systems, Inc. of Mountain View, Calif.
   the digital components of multimedia can be recorded on a CD-ROM (e.g. using CD-ROM burner available from Eastman Kodak Co. of Rochester, N.Y.)
   on-line services provide downloading of files (e.g. Prodigy, Compuserve or Internet).

2) Using the SAS, the author partitions the multimedia presentation into time segments according to predominant time units, e.g. measures of song, sound bites, or action sequences in a movie.

3) Sections of a text track are linked to the time segments.

4) Additional media resources are linked to each of the time segments.

5) Sets of choices available to the user are specified and linked to each of the time segments.

6) Values are linked to the choices.

7) A feedback is linked to the value assigned to each choice.

8) The multimedia game is recorded onto a mass storage media, such as CD-ROM.

9) The multimedia game is distributed to the user via retail outlets, broadcast channels, or on-line services.

10) The multimedia game is played by the user.

The box labeled "Segmentation Authoring Tool" in FIG. 4 outlines the role that the SAS plays in the production process (steps 2 to 7).

Figure 12:
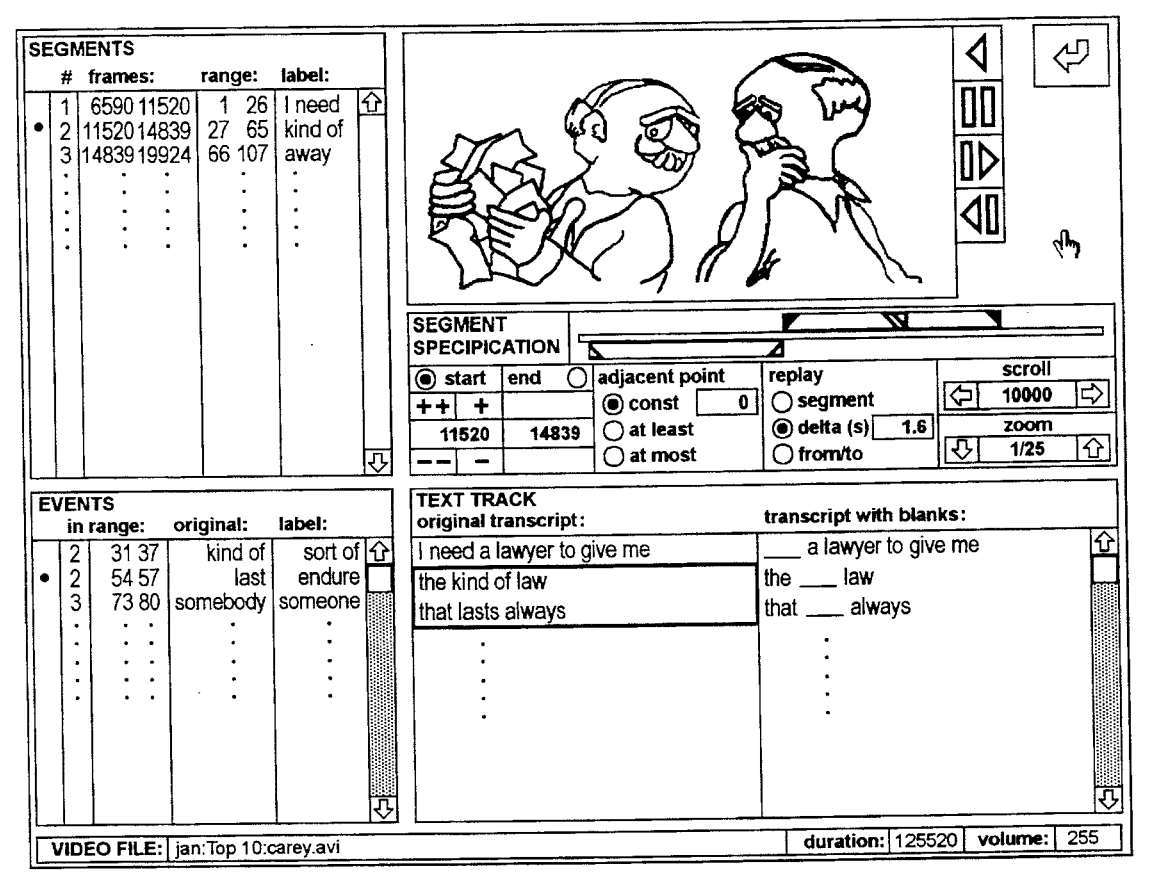

The SAS is particularly useful for editing a time-segmented presentation to obtain a optional multimedia game. As shown in FIG. 12, SAS displays the set of segments already specified and ordered according to their start points. It allows the author to select one current segment from the sequence of segments. The current segment can be then edited. The author can insert a new segment at an arbitrary position in the sequence (e.g. before or after the current segment), and delete the current segment.

To facilitate editing an individual segment, the system displays the current segment's start and end points separately. This way, the author can select which one of these "boundary points" s/he wants to edit. The coordinate of the current boundary point can be moved with respect to the time axis. Since the end point of a segment is closely related to the start point of the next segment, the SAS' user interface allows the author to ensure that changes of the boundary point of one segment are immediately reflected in the changes of the corresponding boundary point of the adjacent segment. The relationship between the two corresponding points includes keeping the distance constant (keeping the distance equal to zero means that the end of one segment will be always the start point of its neighbor), or ensuring that the points remain at least a minimum distance (e.g. to prevent overlapping segments) or ensuring that the points maintain at most a maximum distance (keeping the points close together can simplify editing of the next segment).

Conventional editing systems allow the author to select and replay a time interval. SAS adapts this functionality to segment-based editing allowing the author to replay the current segment. However, to specify the boundary point of a lengthy segment, it is inconvenient to replay the entire segment. Therefore, SAS allows the author to enter a maximum replay time $\Delta T$ labeled "delta" on the screen. If the start point $T_s$ is being modified, the replay interval is always from $T_s$ to $(T_s+\Delta T)$ independent of $T_s$. If the end point $T_e$ is being modified, the replay interval is always from $(T_e-\Delta T)$ to $T_e$ independent of the value of $T_e$. The boundary points can be edited using either a textual/numeric or graphical interface as described herein.

SAS can also be used to simplify the synchronization of the text track with the motion video and sound track. It allows the author to enter text into a text field, select a portion of the text and assign it to a segment. Similarly, SAS allows the author to select a portion of the text track and associate it with choice available to the user (or an "event").

SAS also supports the identification of additional resources associated with each segment and each event. Examples of such resources include additional discrete or continuous media tracks, such as icons, still images, audio, motion video tracks and hypertext links leading to information associated with the segment or the event. These additional resources can be independent, constitute a predefined sequence, or be tied to a time point in between the start and end point of the segment (respective the segment to which the event belongs). The interfaces described herein can be employed to help the author specify a time point or time interval.

As shown in FIG. 12, the output of SAS consists of segment and event tables. The segment table contains the segments' attributes, such as the boundaries of each segment with respect to the time axis, the indices of the segment's text interval within the text track and the identification of additional resources associated with each segment. The event table contains the events' attributes, such as the segment to which each event belongs, the indices of the element's text interval within the text track and the identification of additional resources associated with each event.

4.1. Description of a Music Video Game

A Music Video Game application will be now described to illustrate a preferred implementation of the invention. The Music Video Game uses a music video as a multimedia presentation and combines it with a game that is played on the lyrics of the song. Such games have many uses, such as training reading comprehension, teaching foreign languages, entertaining fans of a music band, etc.

Referring to FIGS. 5 to 7b, the Music Video Game is played using the following sequences of displays and user feedback.

Figure 5:
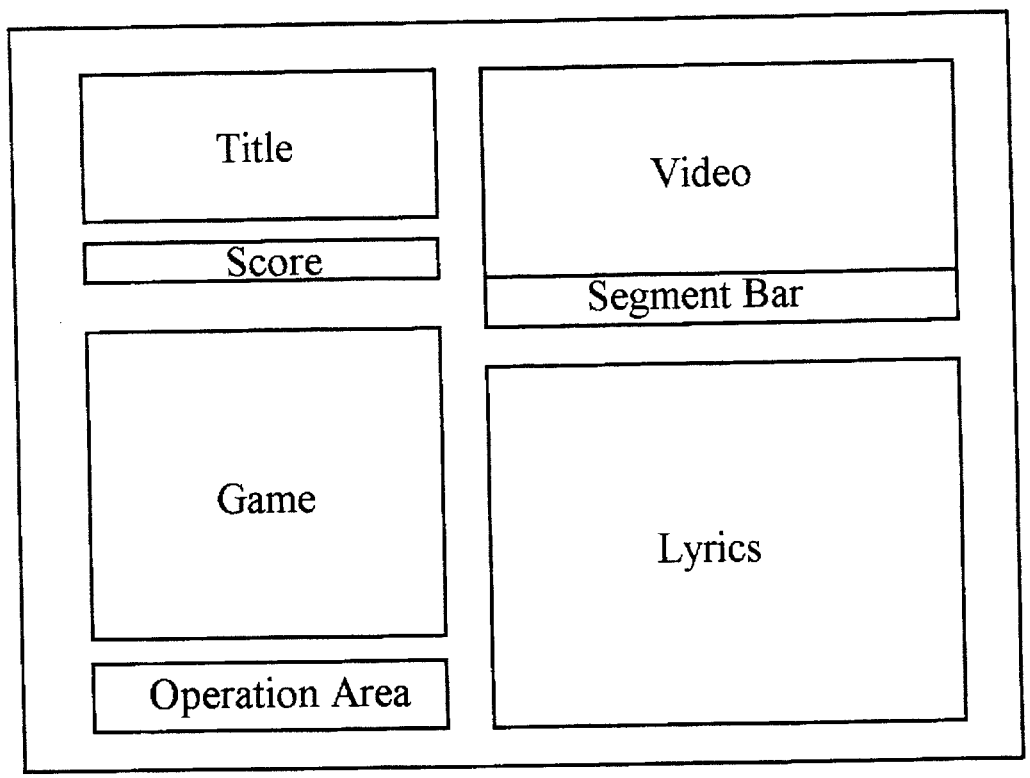
FIG. 5 shows the screen layout of the Music Video Game.

The music video has a motion video track, an audio track and is accompanied by a textual track that shows the lyrics of the song. In FIG. 5, the screen is subdivided into five areas:

video window lyrics field game area title operation toolbar

Figure 6:
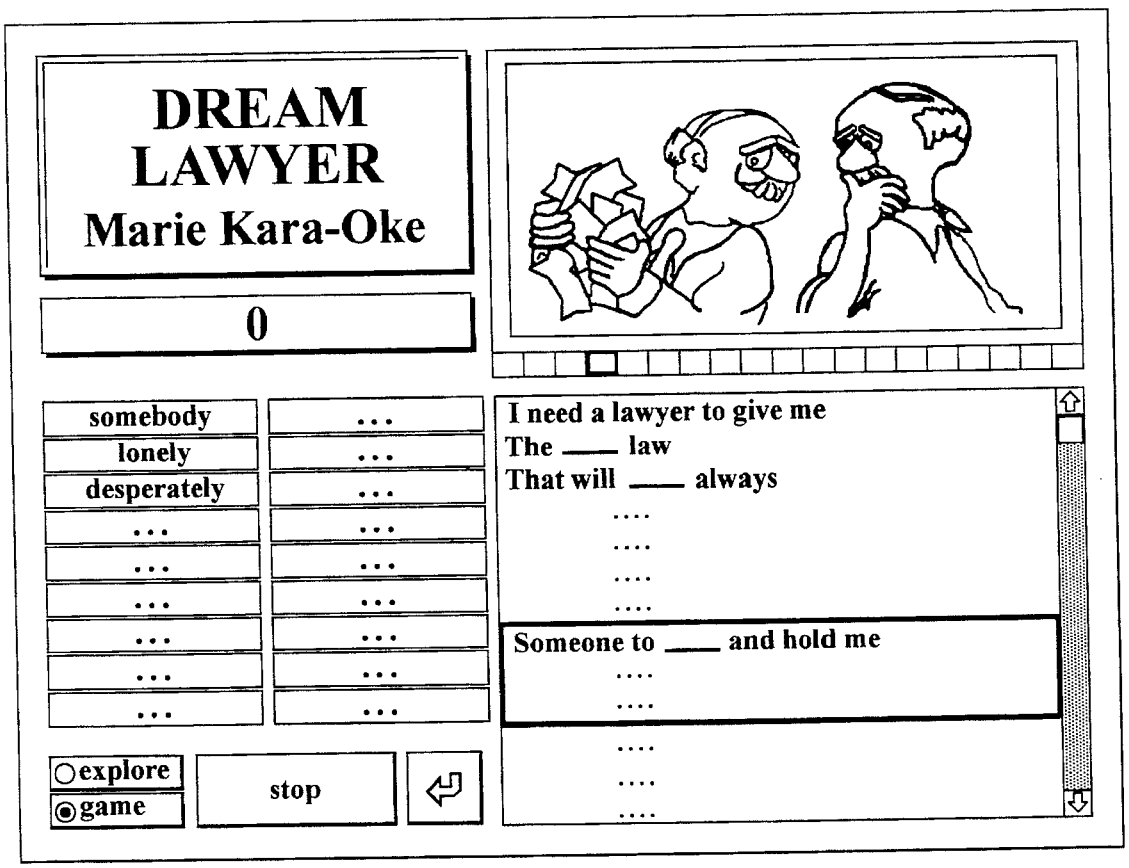
FIG. 6 shows the screen snapshot from the Music Video Game.

FIG. 6 shows a screen snapshot from an implementation of the Music Video Game as it may appear on a computer monitor.

The title area displays the name of the song and the singer. The operation toolbar contains buttons that allow the user to toggle between the "explore" and the "game" mode, start a new game or quit the application.

The video window displays the music video. The video is synchronized with a song's audio as well as with the song's lyrics. The music video is partitioned into time segments that correspond to the song's phrases. While the song is playing, the corresponding phrases are highlighted in the lyrics field. If necessary, the lyric's field is automatically scrolled to reveal the current phrase. The partitioning of the music video into segments is also visualized using a "segment bar" displayed below the video window. The bar is subdivided into small sections that represent the sequence of the time segments. While the music video is playing a segment, the corresponding section of the bar becomes highlighted.

The user can switch between "explore" and "game" mode of interaction as shown in FIG. 3a. In the "explore" mode (FIG. 7a), s/he can click within the video window to start playing the music video and click again to pause. The next click will resume the music video. This way all the segments of the music video can be viewed in their natural sequence. Clicking on a phrase in the lyrics field will highlight it, say it in native speakers voice and then play the corresponding video segment. The user can also click on a segment in the segment bar to play the video starting with the selected segment. Both methods of segment selection stop the currently played video before continuing. This simple user interface allows the user to replay a segment, go to the next or previous segment or choose an arbitrary segment.

Figure 7A:
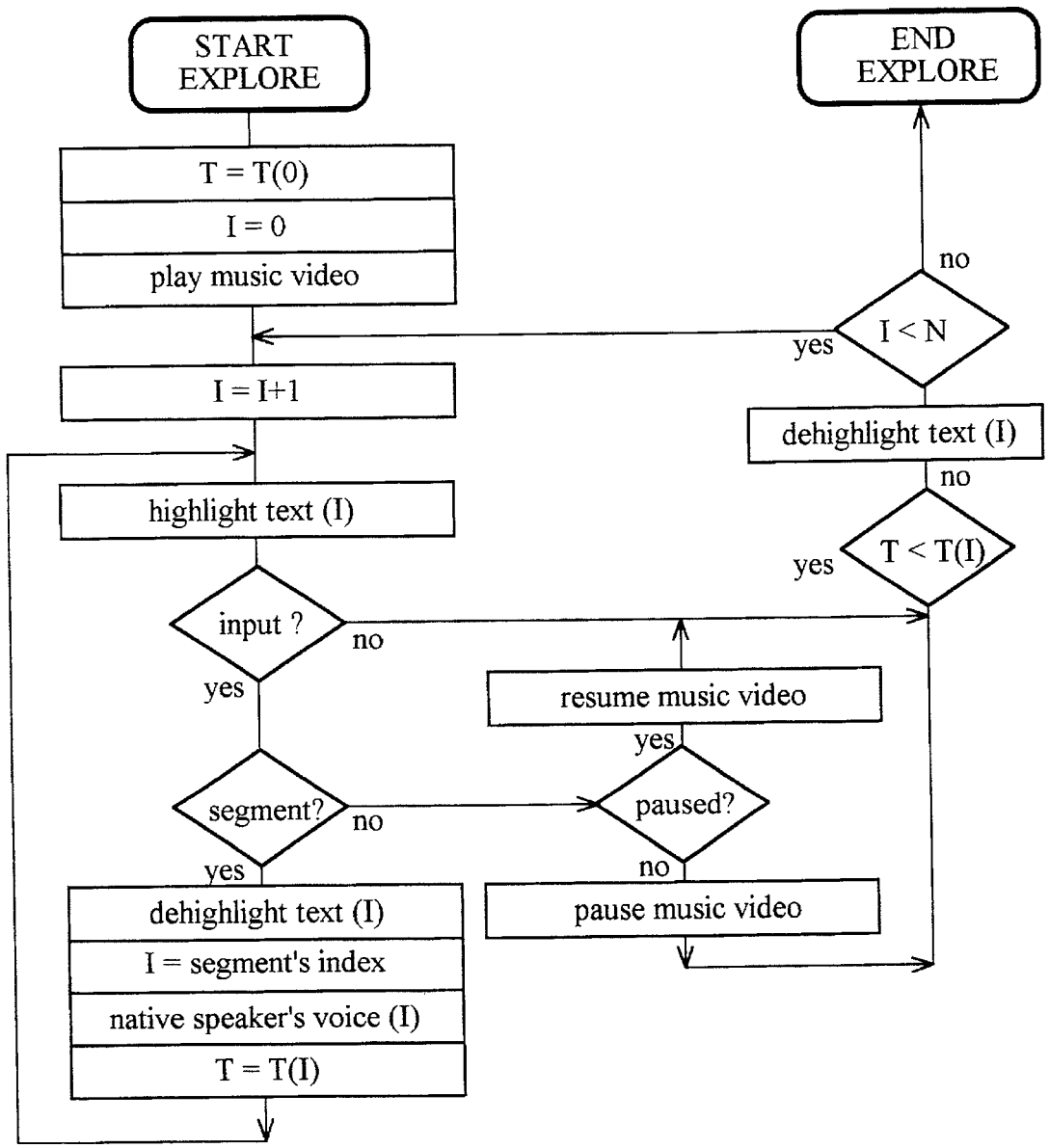
FIG. 7a shows the control flow diagram of explore mode in Music Video Game.
Figure 7B:
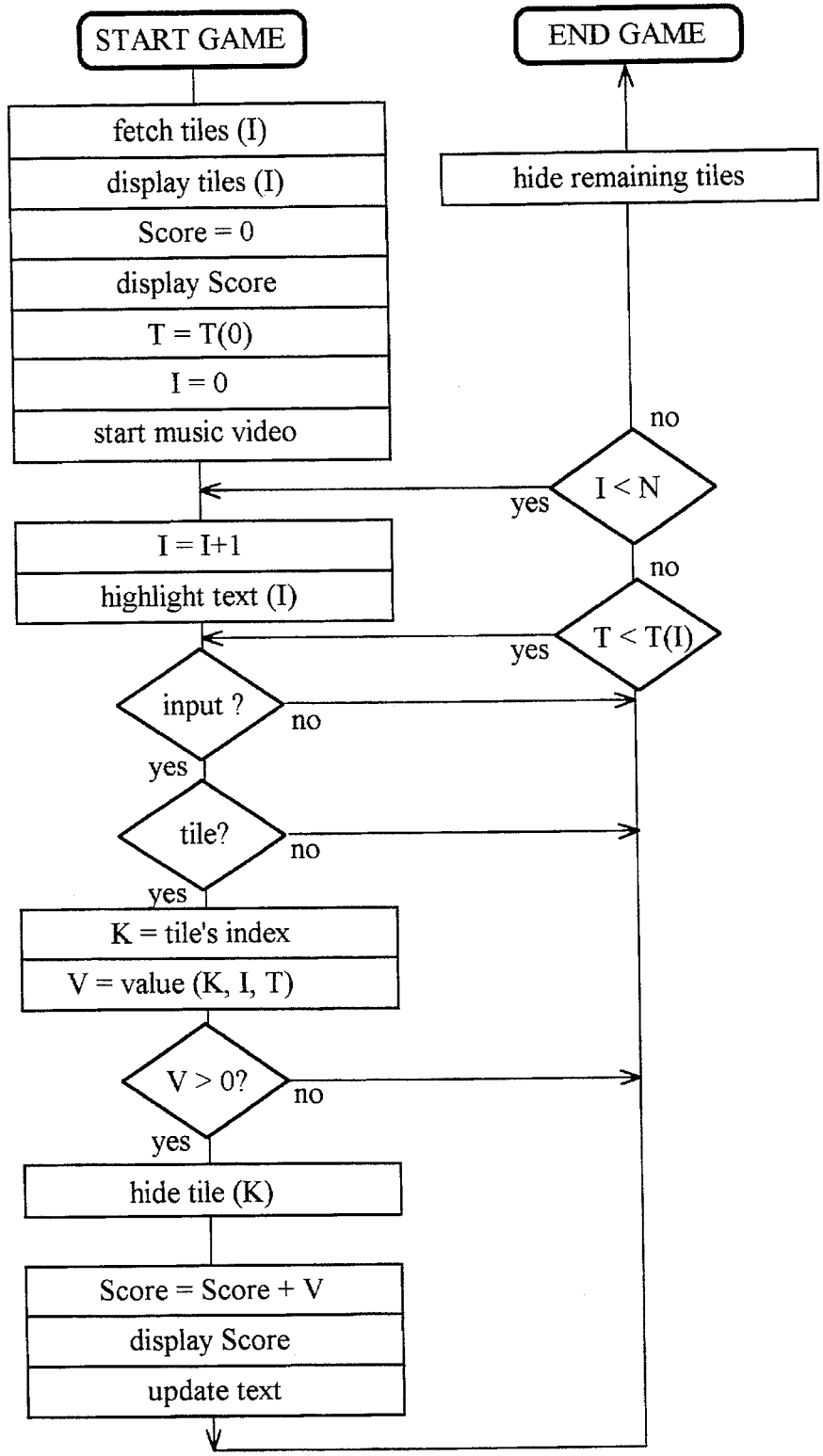
FIG. 7b shows the control flow diagram of game mode in Music Video Game.

When the user switches into the "game" mode, the game area is filled with a score field a set of tiles that can be selected by the user. The game is a well known "fill-in-the-blanks" game. The tiles are labeled with words extracted from the lyrics. In the lyric's field each of these words has been replaced by a dot pattern. The user's task is to fill in as many missing words of the song's lyrics as possible. As shown in FIG. 7b, the game program plays the entire sequence of the presentation's time segments and highlights the current segment in the lyrics and the segment bar. Clicking on one of the tiles (the only relevant interaction in the "game" mode), is evaluated as an attempt to fill the tile's label into the lyrics. The user's choices are limited by the time span of the current segment. If s/he selects a tile whose label is missing from the current time segment, the score is incremented, the label replaces the dot pattern in the lyrics field and the tile is taken off the game area. On the other hand, clicking on a tile that does not fit into the highlighted segment decreases the score. Removing the tiles reveals the singer's picture hidden underneath.

4.2. A Karaoke Game

Another sample variant of the generic Multimedia Game is the "Karaoke Game". This game uses recording hardware, such as a microphone and a sound recording card. Like the "Music Video Game", the "Karaoke Game" uses a music video as a multimedia presentation. In this case the presentation has a motion video track (music video), an instrumental sound track (song melody played by a band), a singer's voice sound track and a text track (the song's lyrics). All of the tracks are synchronized.

In the "explore" mode, the song is played as described for FIGS. 3a and 3b. All of the song's tracks are played simultaneously.

Figure 8A:
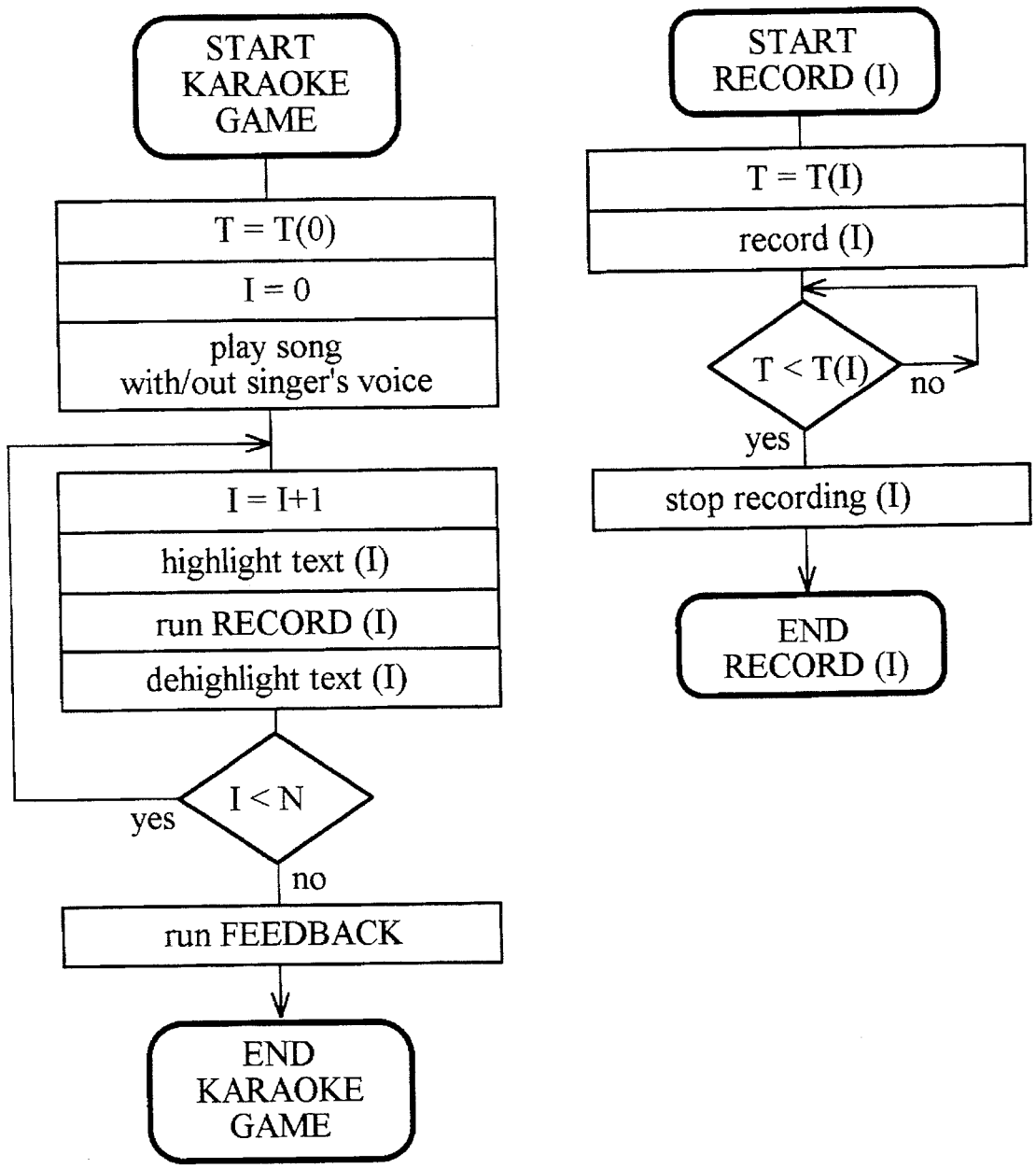
FIG. 8a shows the global control flow diagrams of game mode in Karaoke Game.
Figure 8B:
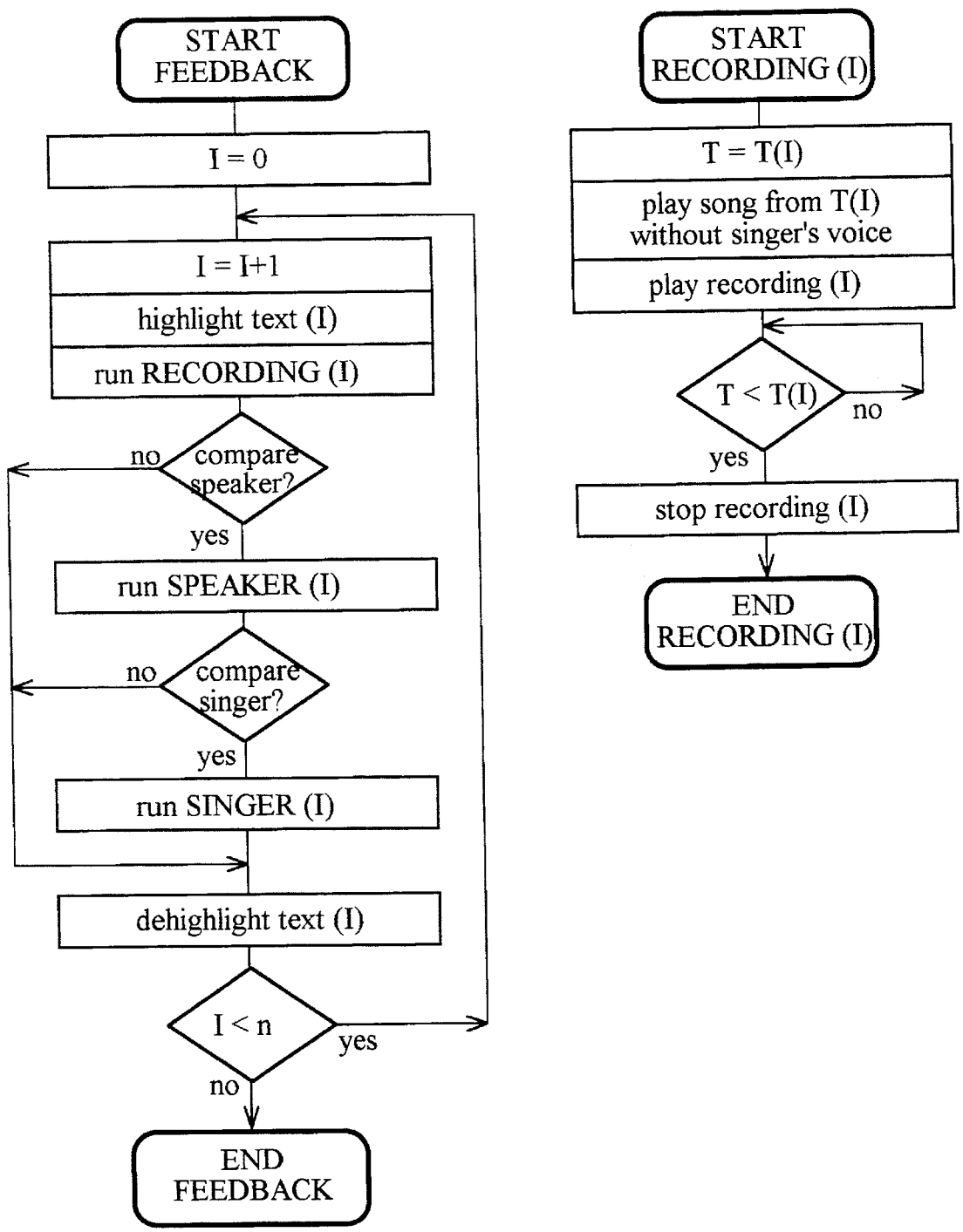
FIG. 8b shows the control flow diagrams of game mode in Karaoke Game (cont.).
Figure 8C:
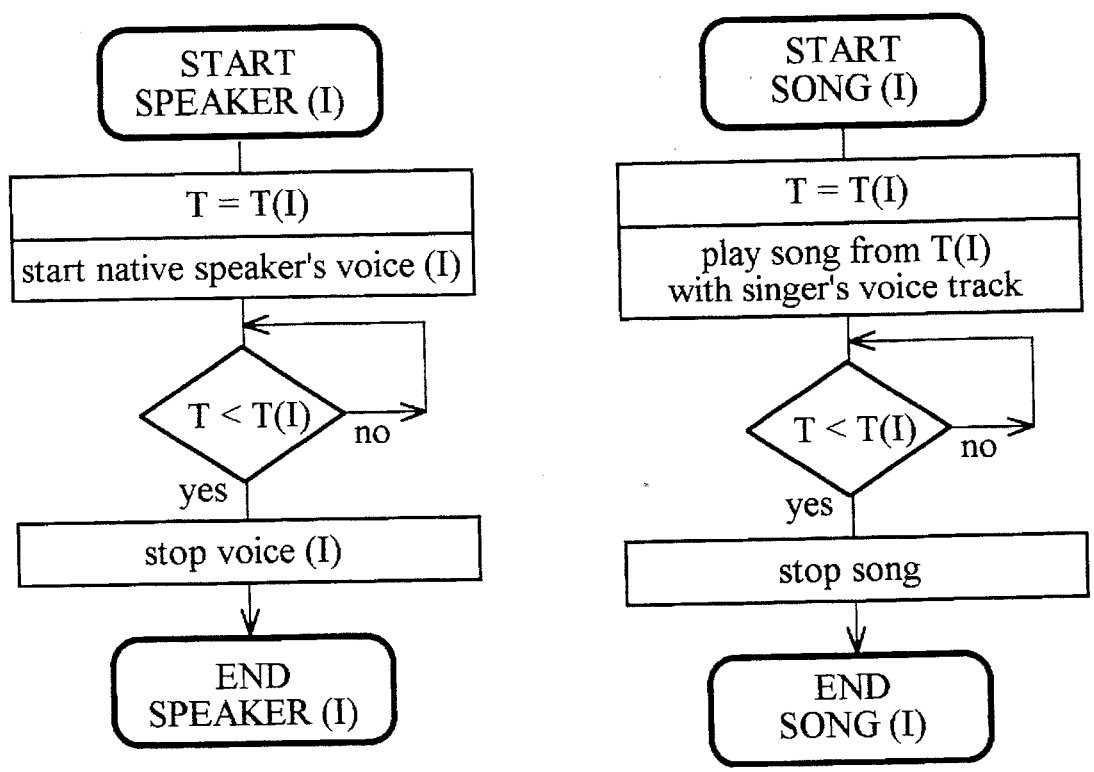
FIG. 8c shows the control flow diagrams of game mode in Karaoke Game (cont.).

In FIGS. 8a, 8b and 8c, the "game" mode for the Karaoke Game is illustrated for an implementation where the evaluation is deferred to the "feedback" stage at the end of the presentation. The presentation is played with or without the singer's voice sound track. While all the segments of the presentation are played in sequence, the "Karaoke Game" records the user's voice. The recording creates a new "user's voice" sound track. As the beginning of this track is well known, the track is synchronized with the other tracks of the presentation. As a consequence, the "user's voice" sound track is partitioned into the same time segments as the other tracks. As an alternative, the user can be allowed to record individual time segments.

After the time segments have been recorded, the "Karaoke Game" enters the "feedback" stage (FIG. 8b and 8c). In this stage, the "user's voice" sound track can be compared to the original singer's voice, or another media track, such as native speaker's voice. The replay can mix (i.e. play simultaneously) any combination of the sound tracks (e.g. singer's voice with user's voice) or, as shown in FIG. 8b, play a sequence of tracks for each time segment (e.g. the first time segment in a native speaker's voice followed by the first time segment in the user's voice and continue with the next time segment using the same sequence of tracks).

In the "feedback" stage, the user's voice can be evaluated and the user can obtain an additional feedback that reflects his or her performance (e.g. an increase in score that depends on the quality of his or her recording).

4.3. A Remote Movie Game

Figure 9A:
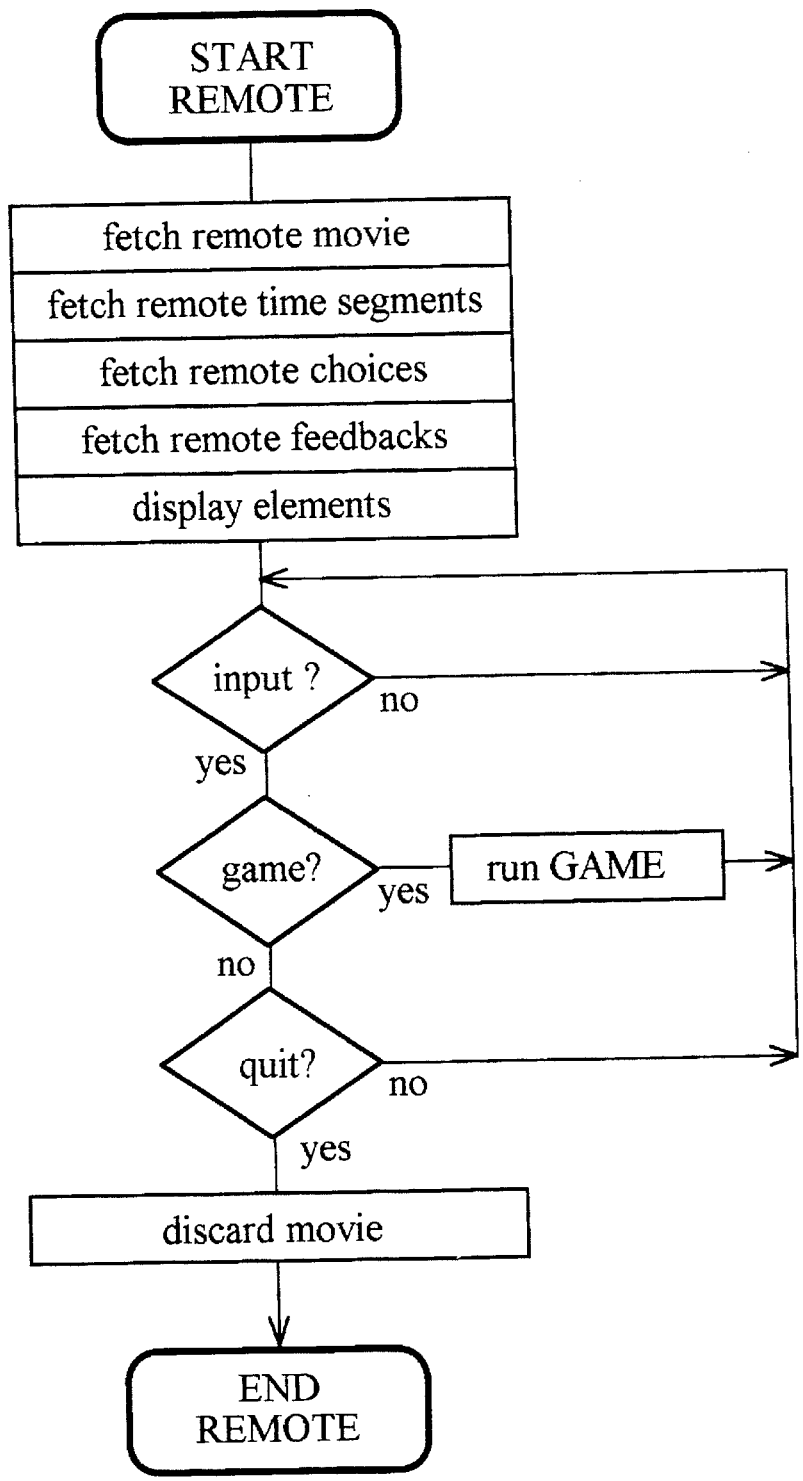
FIG. 9a shows the overall control flow diagram of Remote Movie Game.
Figure 9B:
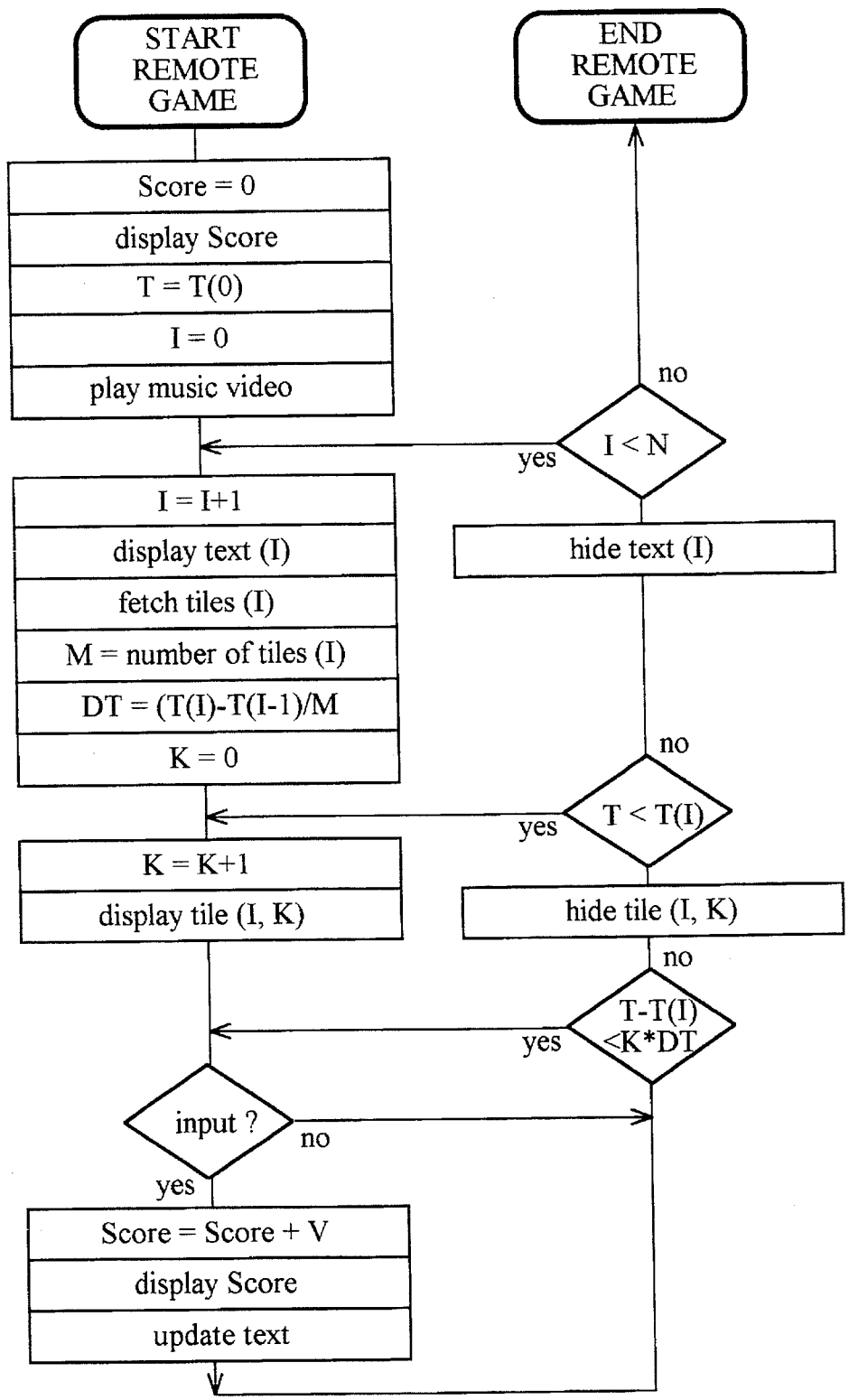
FIG. 9b shows the control flow diagram of game mode in Remote Movie Game.

The Multimedia Game does not need to be stored locally, but could reside at a remote location (e.g. a movie store, a cable programming/distribution station, etc.) and be transmitted (or downloaded) to the local computer e.g. via modem or electronic link. Also the "explore" mode can be omitted. The control flow of such a sample game is depicted in FIGS. 9a and 9b. Before the "Remote Movie Game" starts, all the tracks of the movie (i.e. the presentation) including the text transcription of the dialog, the information about the starting and ending points of the time segments as well as the choices to be presented to the user during each of the time segments, the feedback associated with each choice and possibly the game itself are transmitted to the local computer (FIG. 9a).

The game then proceeds as illustrated in FIG. 9b. This diagram shows a variant of the Multimedia Game that displays less text at a time. This variant can be used if most of the monitor's area should be devoted to the full motion video. In a fashion reminiscent of movie subtitles, the text can be superimposed onto the video. This variant is also more suitable for game player sets (e.g. Sega™ and Nintendo™ players) and interactive TV that is hooked up to monitors that cannot display large amounts of text, such as a TV monitor.

As shown in FIG. 10, when a time segment starts, the corresponding dialog (typically one or two lines) is displayed on the screen. The user's choices are then displayed one at a time. In a "fill-in-the-blanks" game (such as described in 4.1), the choice can be directly integrated into the current dialog lines. Color can be used to distinguish the choice from the original text. According to FIG. 9b, each choice within a time segment is displayed for the same length of time (i.e. length of the time segment divided by the number of choices). Another advantage of this version is that only one type of input is needed. As only one choice is presented at a time, any user input indicates the selection of this choice. User input can be provided via designated control button on the game player, or via remote buttons or controller unit buttons for interactive TV. This selection is then evaluated and its score incremented accordingly.

In a more general game the time span for each of the choices can be set individually. Then these time spans can be thought of as another layer of time subsegments and can be determined using the authoring system described in 3.3.

4.4. Description of a Segmentation Authoring System for Music Video Game

A segmentation authoring system (SAS) for the preferred Music Video Game will now be described. Referring to FIG. 11, the basic process of SAS is shown having the following five modules:

1) management of segments
2) editing of boundary points
3) management of choices
4) editing of text track
5) specification of presentation FIG. 12 shows a screen snapshot from the actual implementation of SAS as it appears on the computer monitor. The screen is subdivided into five areas that correspond to SAS' modules:

segment table segment specification area event table text track area global specification area In the upper left screen area, SAS displays a table that allows the author to manage the set of segments. Here, the author can add a segment, delete a segment, select a segment, link resources to a segment, and link a text section to a segment. The first column of the table contains a field with a bullet marking the current segment. The second column holds the segment indices. The third column shows the start and end points of each segment. The fourth column contains the indices of characters in the text track linked to the segment. The fifth column contains the names of additional resources linked to each segment (in our example the identification of an associated sound track with the native speaker's pronunciation of the segment's text.)

The upper right area of the screen is devoted to the module that allows the author to edit boundary points. Here, the author can choose either the starting or the ending point to become the current boundary point, increase or decrease the time coordinate of the current boundary point, set the replay time span, set the type of replay span, set the delta time (i.e. the distance time span to the adjacent boundary point), set the type of the delta time span, or replay the presentation.

The replay area is at the top part of the screen. Here, the current segment is displayed with icons that allow the author to play the segment, pause it, advance its current boundary by one frame or move its current boundary one frame backwards.

The panel below the replay area contains six control panes:

1) the top pane depicts graphically the time axis with the points important for editing the current segment, 2,3) the rightmost two lower panes show the start and end points of the segment as well as the buttons that allow the author to change them, 4) the third lower pane specifies how changing the boundary points affects the adjacent segment, 5) the fourth lower pane limits the length of the portion of segment that is played, 6) the leftmost lower pane allows the author to scroll the graphical pane and change its scale.

The top graphical pane depicts the relative positions of the current and adjacent segments on the time axis. FIG. 13a shows the pane when the author edits the start point of the current segment (i.e. the start point is the current boundary point.) The adjacent segment is represented by a light gray rectangle and its start and end points are represented as hollow triangle icons. The rectangle representing the current segment is middle gray and its start and end points are represented as black triangle icons. The dark gray rectangle shows the replay time span, i.e. the portion of the current segments that is played. Its end (the "replay limit") is represented by an icon with overlapped hollow triangles.

When the author edits the end point, the adjacent segment is to the right of the current segment. Now the replay time span starts at the "replay limit" icon and its end coincides with the end point of the current segment. (FIG. 13b). Notice that there is now a gap in between the current boundary point and the adjacent point. This "delta" distance is also depicted as a gray interval on the time axis.

FIG. 14 shows the lower panes of the segment specification panel. On the top of its right two panes are round "radio buttons" labeled "start" and "end". One of these buttons is highlighted. It determines which pane is active, i.e. which of the boundary points is currently being edited. The fields below these buttons contain the coordinates of the start and end point of the current segment in thousandths of seconds. In the active pane the buttons labeled "++", "+", "—", and "–" appear on the top and bottom of the coordinate field. These buttons allow the author to increase ("++", "+") or decrease ("—", "–") the coordinate of the current boundary point, in either big ("++", "—") or small ("+", "–") increments.

The third pane of the segment specification area is labeled "adjacent point". It specifies how changes of the current boundary point affect the adjacent point. If the current boundary point is the start point, the adjacent point is the end point of the previous segment. Similarly, the adjacent point of an end point is the start point of the next segment. The third pane contains radio buttons "const", "at least", and "at most". If none of these buttons is selected, changing the current boundary point does not effect the adjacent point. If one of these three buttons is highlighted, a field appears to the left of the button. Here the author can specify the "delta time span" (in thousandths of seconds), i.e. the distance to be maintained in between the current boundary point and the adjacent point. If "const" is selected, the delta time span remains always constant, i.e. any change of the current boundary point causes the same change in the adjacent point. For instance, if delta is zero, then the current boundary point and the adjacent point keep the same coordinates during editing. If "at least" is selected, SAS maintains at least the delta time span in between the current boundary point and the adjacent point. This means that the adjacent point will not be affected if editing increases the distance between the points. If editing decreases the distance, SAS may alter the adjacent point to maintain the delta time span. For example, this setting can be used to ensure that segments do not overlap. Similarly, if "at most" is selected, the adjacent point will not be further than delta from the current boundary point.

The left pane of the segment specification area labeled "replay" helps reduce the "replay time span", i.e. the portion of the segment that is played. It contains two buttons. If the button "segments" is highlighted, the entire segment is replayed when the author click on the iconic "play" button. If the button "delta (s)" is highlighted, it contains a field where the author can type the replay time span in seconds. It limits the replay to the specified time span either from or until the current boundary point (depending whether it is the start or the end point). If the button "from/to" is highlighted, it contains a field where the author can type the coordinate of a time point in thousandths seconds. It limits the replay to the span in between this time point and the current boundary point.

The leftmost pane affects the display in the graphical pane. It contains areas labeled "scroll" and "zoom". The field in the center of the scroll area displays the coordinate of the left end of the time axis. The field is surrounded by left and right arrow buttons, which increase or decrease the value in the field and. as a consequence, scroll the graphical pane. The field in the center of the zoom area shows the scaling factor between the number of pixels on the screen and the time units in thousands of seconds. This actor can attain the values $1/1$, $1/5$, $1/10$, $1/25$, $1/50$, $1/100$, $1/250$, $1/500$, $1/1000$, etc. The field is surrounded by up and down arrow buttons that increase or decrease the value in the zoom field.

The "event table" in the lower left portion of the screen is reserved for the module that allows the author to manage the set of choices (or events). Here, the author can add a choice, delete a choice, select the current choice, link due to the current choice, link feedback to the current choice, and link selected text to the current choice. The table has five columns that show how the choices relate to the segments and their intervals in the text track. The left column contains a bullet marking the current choice. Each choice must be fully contained within one segment; the second and third column identify the section of the text track that is linked to the choice (i.e. the indices of the choice's beginning and ending characters and the text section itself). The rightmost column contains the resources linked to the choice, e.g. the label of a tile to be displayed in the game area.

The lower right portion of the screen allows the author to edit the text track. Here, he or she can select a section of the text and use the standard text editing operations (typing in, cut, copy, and paste) to insert and delete text sections. The left field of the text track contains the complete transcript of the text to be synchronized. The left field of the text track helps visualize the events by replacing the events' text with dot patterns.

The area on the bottom of the screen is used for the modules that allows the author to specify the global attributes of the multimedia presentation. It shows the presentation's file name, its duration in thousandths of seconds and the volume of its audio track.

Operates of SAS by the author will now be described.

Clicking on any row of the segment table makes the corresponding segment the current segment (i.e. marks it, highlights its text in the text track area and fills its start and end points into the segment specification area). Similarly, clicking on any row of the event table makes the corresponding choice the current choice (i.e. marks it, and highlights its text in the text track area). Changing the current choice also changes the current segment so that the current choice always belongs to the current segment.

The author can edit the text in the transcript field of the text track. SAS automatically updates the character indices in the segment and event tables. For example, as new text is inserted (typed in or pasted), all character indices of the following choices and segments will be increased. As text is deleted, all character indices of the following choices and segments will be decreased. Deleting text can erase choices or segments.

The "Author" menu contains commands that edit the segment and event tables (FIG. 15). The command "Init Segments" clears the entire table (i.e. deletes all segments.) The command "New Segment" inserts a new segment either before or after the current segment with both boundary points equal to either the start point or the end point of the current segment. The command "Delete Segment" deletes the current segment. Then, either the following or (if the last segment is deleted) the preceding segment becomes the current segment. The command "Update Segment" interprets the begin and end of the current selection in the text field as the attributes of the current segment and updates these attributes in the segment table.

The command "Init Events" in the "Author" menu clears the entire table (i.e. deletes all choices.) The command "Delete Event" deletes the current choice. Then, it makes either the following or, if the last choice is deleted, the preceding choice the current choice. The command "New Event" inserts a new choice as the last choice in the table. The command "Update Event" links the current selection in the text track to the current choice. It updates indices of the beginning and ending character of the section in the event table and reorders the table if necessary to maintain the choices sorted according to the index of the beginning character. The command "Associate" provides the author with another way to link a choice with the current segment.

The effect of any editing command can be reversed using the command "Undo". SAS always warns the author if the editing command s/he chose results in an inconsistent table, e.g. if the text interval of an updated choice overlaps the segment boundary or the text interval of an updated segment is out of order. The command "Check" allows the author to look for such inconsistencies.

The graphical pane of the segment specification area can be also used for editing and changing the editing parameters. Dragging the icon of the current boundary point changes its coordinate. Since the replay time span must remain constant, this operation also changes the position of the "replay limit" icon. Furthermore, depending on which button is selected in the "adjacent point" pane, the coordinate of the adjacent point might be changed, too. Dragging the "replay limit" icon changes the value in the field associated with the highlighted button in the "replay" pane. Finally, dragging the icon of the adjacent point changes the "delta" time in the "adjacent point" pane.

All these changes are immediately reflected in the corresponding fields in the segment specification area. Conversely, changing the values in the other panes has an immediate impact on the position of the corresponding icons in the graphical pane.

5. INDUSTRIAL APPLICABILITY AND FUTURE APPLICATIONS

The described invention can incorporate future facilities. It is neither dependent on the format in which data is stored nor on the format in which it is generated and presented. Tracks can be stored in analog format rather than digitally and any compression techniques can be used. Moreover, such tracks can be generated directly using a software program rather than using digitized or analog data. The audio track can be generated rather than recorded (e.g. using a speech generator.) The textual track can be generated rather than recorded (e.g. using a direct translation into another language.) Any of the tracks of presentation can be generated remotely and transmitted using any existing communication means. The motion image track can include any visual continuous time based presentation, such as 3-dimensional holograms and be also generated, e.g. using virtual reality systems.

The Multimedia Game does not need to play the presentation's time segments in their natural order. For instance an "Ordering Game" can present the time segments in shuffled order and let the user find a predetermined correct sequence. The evaluation with the Multimedia Game can be asynchronous, i.e. user's interaction with can be recorded and evaluated at later time. This way a teacher can evaluate a students' performance and provide motivating feedback. Other tracks of the multimedia presentation can involve other sensory input and output such as smell, taste and tactile sensations, as well as activation and analysis of user's neural signals. The same extensions of input and output are feasible for the presentation and selection of user's choices within the evaluation tool. In addition, handwriting recognition can be used for user's input. The presentation and time segments can be associated with a variety of other resources. For instance clicking on a word in the text track can lead to a dictionary, a thesaurus, an encyclopedia, a library catalog or establish a connection with a remote on-line service, initiate a search query and display its results. The invention is also independent of the presentation of the choices and the evaluation feedback. The choices and the feedback can be, for instance integrated into a picture of a board game, such as a crossword puzzle or Monopoly™. The extensions of the output described above can be used to provide the user with feedback indicating the value of his/her choices. The evaluation can involve such feedback as visualization of differences in pronunciation patterns and any processes involved in generating speech, such as positions of tongue and other parts of human body and air flow patterns or correct pronunciation based on the user's voice signature. The difficulty of the tasks can be changed by varying the speed of the multimedia presentation in the evaluation mode. Alternately tracks can be changed or omitted in evaluation mode, e.g. by muting the sound track, hiding the text track or presenting its translation into another language. Also the real-time recording of user's interaction with the system can be incorporated into either the presentation or the presentation of the choices in the evaluation mode.

I claim:

1. A multimedia game playing system comprising:

a multimedia presentation comprised of a plurality of recorded media tracks with at least a video track that is clocked in accordance with time address points of a given time axis;

a game player unit having user input means for entering user input for playing a game on said game player unit, game playing means including programmed game sequence means for playing a programmed game sequence on said game player unit incorporating video images therewith in conjunction with the user input received through said user input means, and output means including at least a video display screen for displaying video images of the programmed game sequence in conjunction with the user input, wherein said game player unit has associated therewith multimedia handling means including at least video input means for receiving said video track of said multimedia presentation and video output means for displaying said video track on said video display screen, wherein said video track of said multimedia presentation is divided into a plurality of presentation segments having respective start and end time address points with respect to the given time axis, and wherein the programmed game sequence means of said game playing means includes a plurality of game sequence subunits each of which is operationally linked to the start and end time address points of a respective one of said video track presentation segments, wherein each of the game sequence subunits includes game choices which are displayed in conjunction with display of the respective video track presentation segment during a time period delimited by the start and end time address points for the respective presentation segment, and wherein said game playing means of said game player unit operates in a play mode to play said presentation segments of said video track of said multimedia presentation in a continuous sequence and to display the game choices of the respective game sequence subunits linked thereto, and said gate playing means receives a user input at any time during the time periods of the multimedia presentation segments played in the continuous sequence and enters the user input as a game choice for a respective game sequence subunit linked to the corresponding presentation segment played in the time period during which the user input is received, whereby the programmed game sequence is played on the game player unit by user input of selections for the game choices in conjunction with the display of the game choices of the game sequence subunits together with the display of the video track presentation segments of the multimedia presentation.

2. A multimedia game playing system according to claim 1, wherein said game player unit is a computer terminal, and said multimedia presentation is input to said computer terminal through one or more devices of the group comprising a CD-ROM unit, a magnetic disk storage unit, a laser disk storage unit, and an audio/video input device providing the multimedia presentation in digital format or through a digital converter.

3. A multimedia game playing system according to claim 1, wherein said multimedia presentation includes a video motion track, an audio track, and a text track synchronized together with respect to the given time axis.

4. A multimedia game playing system according to claim 1, wherein the presentation segments of said video track are defined with contiguous start and end time address points, and the time segments are ordered for sequential presentation.

5. A multimedia game playing system according to claim 1, wherein said multimedia presentation is a movie presentation having synchronized motion video, sound audio, and dialog text tracks, the time segments are dialog sequence units, and said game game sequence subunits include means for inputting user choices for the dialog text and for providing feedback by comparison of the user's choices for dialog text with the dialog text track.

6. A multimedia game playing system according to claim 1, wherein said multimedia presentation is a remote movie presentation, and said system further comprises a receiver unit for receiving said movie presentation remotely and downloading it to said game player unit.

7. A multimedia game playing system according to claim 1, wherein said game sequence subunits of said programmed game sequence includes user feedback associated with user selection of game choices for display on said video display screen.

8. A multimedia game playing system according to claim 7, wherein said user feedback includes means for evaluating a user input of selection of game choices and displaying a value or response associated with the user selection.

9. A multimedia game playing system comprising:

a multimedia presentation comprised of a plurality of recorded media tracks with at least a video track that is clocked in accordance with time address points of a given time axis;

a game player unit having user input means for entering user input for playing a game on said game player unit, game playing means including programmed game sequence means for playing a programmed game sequence on said game player unit incorporating video images therewith in conjunction with the user input received through said user input means, and output means including at least a video display screen for displaying video images of the programmed game sequence in conjunction with the user input, wherein said game player unit has associated therewith multimedia handling means including, at least video input means for receiving said video track of said multimedia presentation and video output means for displaying said video track on said video display screen, wherein said video track of said multimedia presentation is divided into a plurality of presentation segments having respective start and end time address points with respect to the given time axis, and wherein the programmed game sequence means of said game playing means includes a plurality of game sequence subunits which are operationally linked to the start and end time address points of respective ones of said video track presentation segments, and wherein the game sequence subunits includes game choices which are displayed in conjunction with display of the respective video track presentation segments during a time period delimited by the start and end time address points for the respective presentation segments, wherein the programmed game sequence is played on the game player unit by user input of selections for the game choices in conjunction with the display of the video track presentation segments of the multimedia presentation, and wherein said multimedia presentation is a music video presentation having synchronized motion video, music audio, and lyric text tracks, the time segments are measures of a song, and said game sequence subunits include means for allowing the input of user choices for the lyrics for each measure of the song in conjunction with displaying of the motion video track and audio playing of the music audio track for the song and for providing feedback by comparison of the user's choices for the lyrics with the lyric text track.

10. A multimedia game playing system comprising:

a multimedia presentation comprised of a plurality of recorded media tracks with at least a video track that is clocked in accordance with time address points of a given time axis;

a game player unit having user input means for entering user input for playing a game on said game player unit, game playing means including programmed game sequence means for playing a programmed game sequence on said game player unit incorporating video images therewith in conjunction with the user input received through said user input means, and output means including at least a video display screen for displaying video images of the programmed game sequence in conjunction with the user input, wherein said game player unit has associated therewith multimedia handling means including at least video input means for receiving said video track of said multimedia presentation and video output means for displaying said video track on said video display screen, wherein said video track of said multimedia presentation is divided into a plurality of presentation segments having respective start and end time address points with respect to the given time axis, and wherein the programmed game sequence means of said game playing means includes a plurality of game sequence subunits which are operationally linked to the start and end time address points of respective ones of said track presentation segments, and wherein the game sequence subunits includes, game choices which are displayed in conjunction with display of the respective video track presentation segments during a time period delimited by the start and end time address points for the respective presentation segments, wherein the programmed game sequence is played on the game player unit by user input of selections for the game choices in conjunction with the display of the video track presentation segments of the multimedia presentation, and wherein said multimedia presentation is a karaoke presentation having synchronized motion video, music audio, and song lyrics tracks, the time segments are measures of a song, and said game game sequence subunits include means for inputting a user voice audio track in conjunction with displaying of the motion video track and audio playing of the music audio track for the song and for providing feedback by comparison of the user's voice audio track to the music audio track.

11. A multimedia game authoring system comprising:

a multimedia presentation comprised of a plurality of recorded media tracks with at least a video track that is clocked in accordance with time address points of a given time axis;

a game player unit having at least video input means for receiving said video track of said multimedia presentation, user input means for entering user input for playing a programmed game sequence on said game player unit, game playing means for playing in a play mode said presentation segments of said video track of said multimedia presentation in a continuous sequence and a programmed game sequence incorporating video images therewith in conjunction with the user input received through said user input means, and output means including at least a video display screen for displaying the video track of the multimedia presentation in conjunction with the video images of the programmed game sequence and user input; and an authoring system having user interface means for dividing at least said video track of said multimedia presentation into a plurality of presentation segments having respective start and end time address points on the time axis, for linking each of a plurality of game sequence subunits of said programmed game sequence to start and end time address points of a respective one of said video track presentation segments, for defining game choices for each of the game sequence subunits which are to be displayed in conjunction with display of the respective video track presentation segment during a time period delimited by the start and end time address points for the respective presentation segment, and for assigning a value or feedback response to each of the defined game choices which may be selected by a user, said authoring system having time addressing means for defining the time when a user input is received by the game playing means during the time periods of the multimedia presentation segments played in the continuous sequence and for addressing a respective game sequence subunit linked to the corresponding presentation segment having the time period during which the user input is received.

12. A multimedia game authoring system according to claim 11, wherein said game player unit and said authoring tool are combined in a computer terminal, and said multimedia presentation is input to said computer terminal through one or more devices of the group comprising a CD-ROM unit, a magnetic disk storage unit, a laser disk storage unit, and an audio/video input device providing the multimedia presentation in digital format or through a digital converter.

13. A multimedia game authoring system according to claim 11, wherein said multimedia presentation includes a video motion track, an audio track, and a text track synchronized together with respect to the given time axis.

14. A multimedia game authoring system according to claim 11, wherein the presentation segments of said video track are defined with contiguous start and end time address points, and the presentation segments are ordered for sequential presentation.

15. A multimedia game authoring system according to claim 11, wherein said authoring tool includes means for defining user feedback associated with user selection of corresponding game choices for the game sequence subunits of said programmed game sequence.

16. A multimedia game authoring system according to claim 15, wherein said means for defining user feedback includes means for defining a value or response associated with the user selection for display on said video display screen.

* * * * *